United States Patent [19]

Moritomo

[11] Patent Number: 5,442,610
[45] Date of Patent: Aug. 15, 1995

[54] METHOD FOR PROCESSING AN ANOMALOUS WRITING IN AN OPTICAL DISK APPARATUS

[75] Inventor: Ichiro Moritomo, Sagamihara, Japan
[73] Assignee: Ricoh Company Ltd., Tokyo, Japan
[21] Appl. No.: 366,013
[22] Filed: Dec. 29, 1994

Related U.S. Application Data

[63] Continuation of Ser. No. 947,135, Sep. 18, 1992, abandoned.

[30] Foreign Application Priority Data

Sep. 24, 1991 [JP] Japan .................. 3-272123

[51] Int. Cl.⁶ .............................................. G11B 7/00
[52] U.S. Cl. ........................... 369/47; 369/54; 369/58
[58] Field of Search ...................... 369/32, 47–50, 369/53–54, 58, 124

[56] References Cited

U.S. PATENT DOCUMENTS 4,879,704  11/1989  Takagi et al. ............... 369/58 X
5,047,874  9/1991  Yomtoubian ............... 369/58 X
5,075,804  12/1991  Deyring .................... 369/54 X
5,237,553  8/1993  Fukushima et al. .......... 369/58

FOREIGN PATENT DOCUMENTS 1196775  8/1989  Japan .

OTHER PUBLICATIONS

Patent Abstracts of Japan, vol. 13, No. 495, [P956] Nov. 9, 1989, & JP 1-196775.

Primary Examiner—W. R. Young
Attorney, Agent, or Firm—Cooper & Dunham

[57] ABSTRACT

A method for controlling an optical disk apparatus when writing information into a defective sector, by storing a management table for alternate process in a memory for control, and by writing the management table into a storage medium. When a writing operation is abnormally ended in an anomalous state and when the alternate process is consecutively repeated for a defective sector, an upper limit of times of alternate process is set. When the number of alternate processes repeated reaches a preset number, the writing is suspended. Updating of the management table for alternate process may be inhibited.

5 Claims, 5 Drawing Sheets

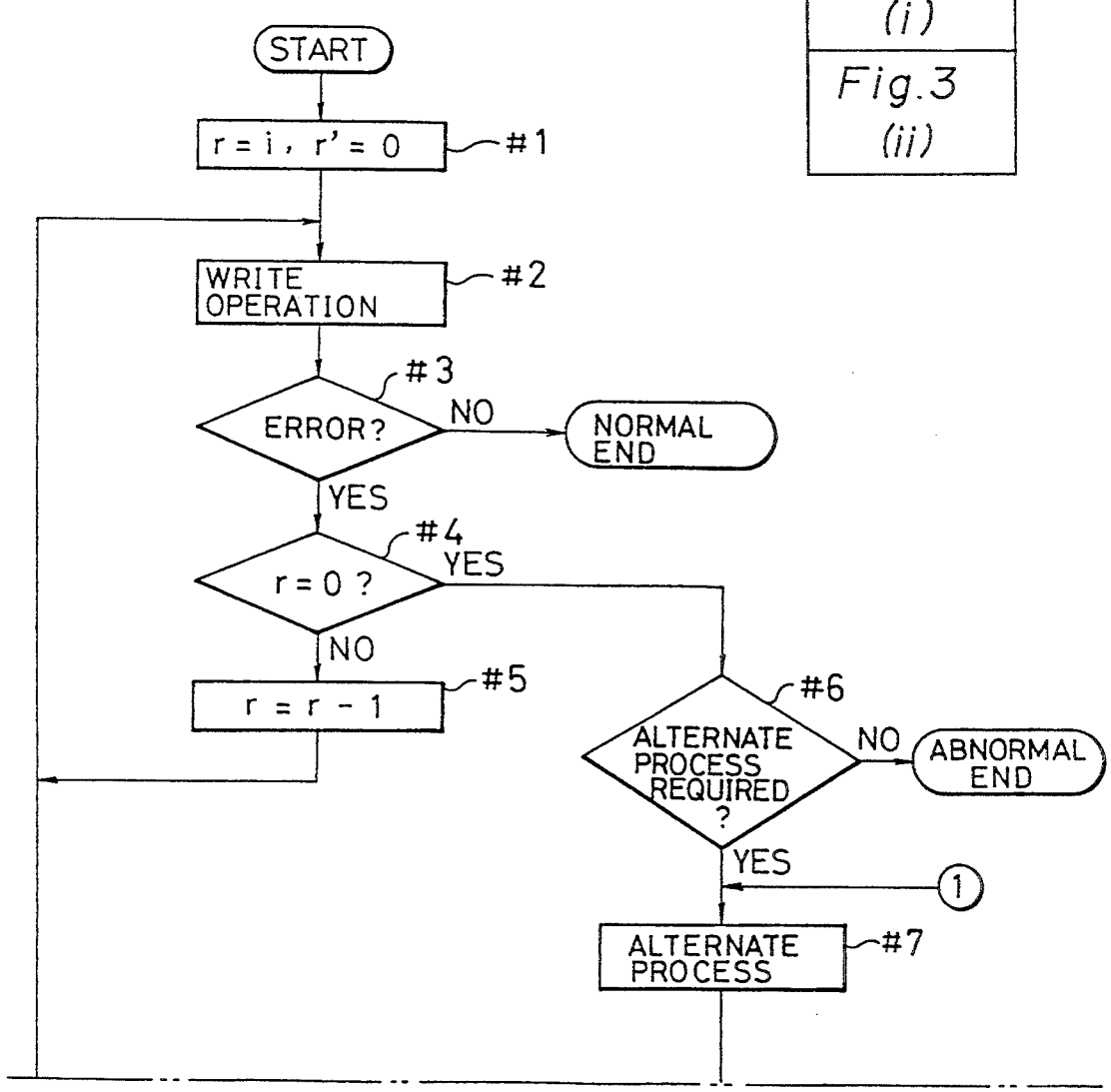

Fig. 3 (ii)
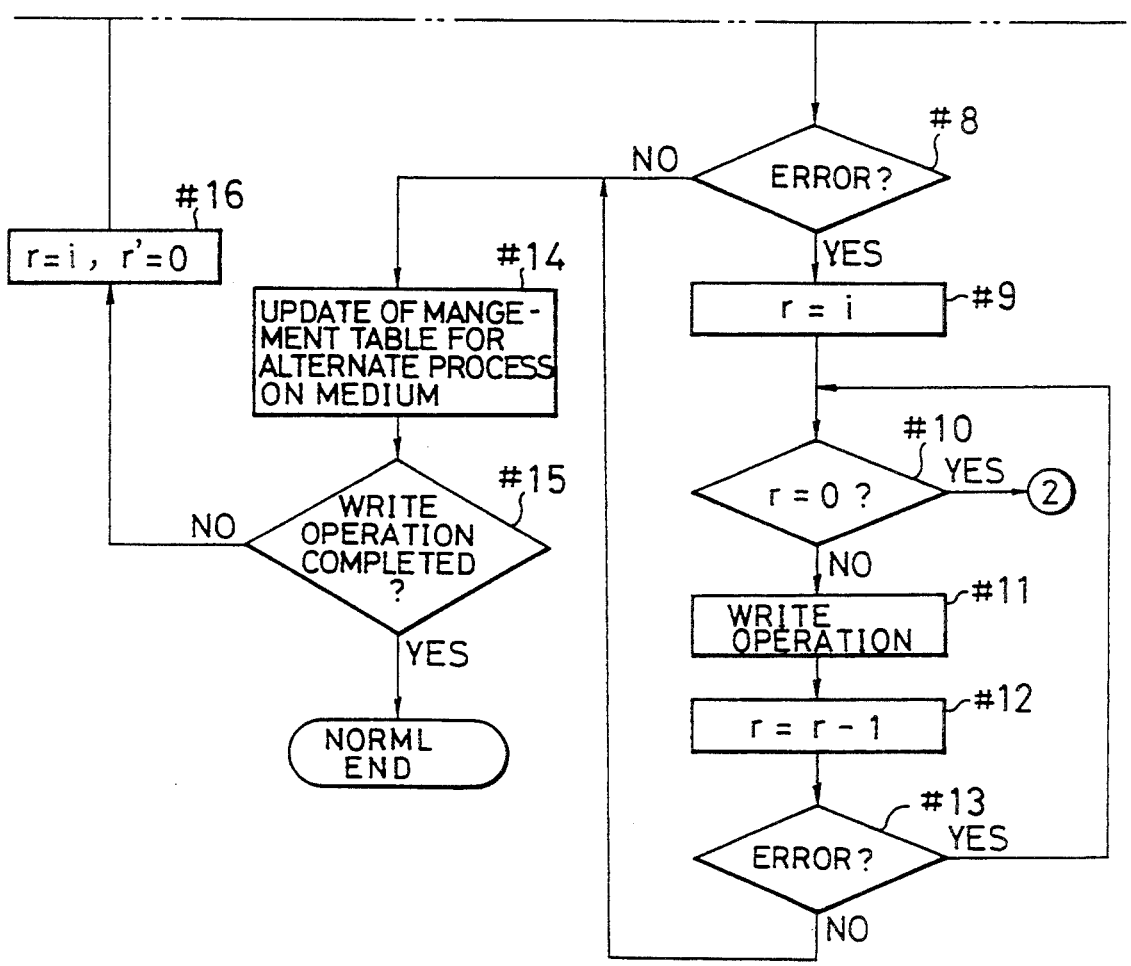

METHOD FOR PROCESSING AN ANOMALOUS WRITING IN AN OPTICAL DISK APPARATUS

This is a continuation of application Ser. No. 07/947,135, filed Sep. 18, 1992, abandoned.

BACKGROUND OF THE INVENTION

1. Field of the Invention

The present invention relates to an improvement in processing anomalous writing in an optical disk apparatus. More particularly, the invention relates to an optical disk apparatus and a control thereof, which is provided with functions for alternate or substitution process of defective sector, for storing a management table for alternate process in a memory for control, and for writing the table into a storage medium, wherein if a writing operation is not normally ended due to occurrence of anomalous state and if the alternate process is consecutively repeated for a sector, an upper limit of times of alternate process is set to reduce a processing time, and the management table for alternate process is prevented from being broken, increasing a reliability of system.

2. Description of the Related Art

An optical disk apparatus consists of a drive unit with an interface for a storage medium and a control unit with an interface for a host apparatus as well as a memory for control.

Conventional optical disk apparatus are provided with functions for alternate process of defective sector, for storing a management table for alternate process in a memory for control, and for writing the table into the storage medium, for example in Japanese Unexamined Patent Publication No. 1-196775.

The conventional optical disk apparatus, however, repeat the alternate process before sectors for alternate process are used up if the alternate process is consecutively repeated for a sector, because there is no limit of alternate process set.

Further, there is another problem of rewriting the management table for alternate process on the storage medium when an anomalous writing occurs.

SUMMARY OF THE INVENTION

It is an object of the present invention to provide an optical disk apparatus and a control method thereof in which a process time is reduced and data of management table for alternate process is prevented from being broken by anomalous writing.

The object of the present invention can be achieved by an optical disk apparatus provided with functions for writing information into a sector, for executing an alternate process for a defective sector, for storing a management table for alternate process in a memory for control, and for writing the table into a storage medium, in which control means is provided for suspending the writing of the information into a sector if the writing cannot be finished due to occurrence of anomalous state and if the alternate process is consecutively repeated for a defective sector by a preset number of times.

The object of the present invention can further be achieved by a method for processing an anomalous writing in an optical disk apparatus provided with functions for writing information into a sector, for executing an alternate process of effective sector, for storing a management table for alternate process in a memory for control, and for writing the table into a storage medium, comprising: setting a predetermined number for alternate process; comparing a number of repetition of alternate process with said predetermined number for alternate process if the alternate process is consecutively repeated for a defective sector; and suspending the writing of information into a sector when the number of repetition of alternate process reaches said predetermined number for alternate process on the comparison.

In the present invention, if the information writing operation is not normally ended due to occurrence of anomalous state and if the alternate process is consecutively repeated for a defective sector, an upper limit is set for repetition of alternate process to suspend the information writing operation after predetermined times of trial, reducing a process time.

In the present invention, since the number of consecutive alternate processes repeated is limited for a defective sector, a report process may be shortened to a host apparatus upon occurrence of anomalous state.

In one aspect of the present invention, update may be stopped for the management table for alternate process written on the storage medium in addition to the suspension of the information writing.

There is a possibility to break data of management table for alternate process upon occurrence of anomalous state of information writing operation, and therefore rewriting of table is stopped to prevent the management table for alternate process from being broken.

In this aspect of the present invention, when the information writing operation is anomalous, the content of management table for alternate process on the storage medium is stopped rewriting, increasing a reliability of management table.

In another aspect of the present invention, after the suspension of information writing, the content of management table for alternate process on the storage medium may be read to store the content in the memory for control, and the occurrence of anomalous state may be informed of.

If an alternate process should be carried out immediately before consecutive alternate processes due to occurrence of anomalous state, the management table for alternate process in the memory for control must have been rewritten. In order to make a content of management table on the storage medium consistent with a content of management table in the memory for control, the content of management table on the storage medium is read and thereafter a host apparatus is informed of occurrence of anomalous writing.

In this aspect, an alternate process cannot be admitted which is suspicious of reliability, that is, the management table for alternate process is not updated, and the host apparatus is informed of the occurrence of anomalous writing, increasing the reliability of system.

In the above aspect, if a reading operation of content of management table for alternate process on the storage medium is ended in an anomalous state, all operations including an access to the storage medium may be stopped and the apparatus may inform a host apparatus of the occurrence of anomalous state of reading operation with a preset error code.

If the reading operation of content of management table on the storage medium were ended in an anomalous state in a preceding process, an anomaly must have occurred in the writing operation as well as in the reading operation. Accordingly, a predetermined error code is set to report an inability of continuation of operation to a host apparatus.

In this aspect, the error code may be held in a control unit to answer any command from the host apparatus with the error code.

The control unit holds the error code to prevent the host apparatus from overlooking the error code. The optical disk apparatus always answers with the error code against any command from the host apparatus.

The arrangement of the above aspect is excellent in many respects, for example, in sure protection of data in that the anomalous state of writing and reading is held, while being in a state where a report of occurrence of anomaly is always possible against a command from the host apparatus, making an access to the storage medium unable.

Further objects and advantages of the present invention will be apparent from the following description of the preferred embodiment of the invention as illustrated in the accompanying drawings.

BRIEF DESCRIPTION OF THE DRAWINGS

FIG. 3 shows the manner in which FIG. 3(i) and FIG. 3(ii) are connected.

FIG. 3(i) is a first part of a flowchart to show a flow of main processes for an anomaly judgement and alternate process in the optical disk apparatus of the present invention; and FIG. 3(ii) is a second part of a flowchart to show a flow of main processes for an anomaly judgement and alternate process in the optical disk apparatus of the present invention.

DESCRIPTION OF THE PREFERRED EMBODIMENT

There is an embodiment of an optical disk apparatus according to the present invention explained with reference to the accompanying drawings.

Figure 1:
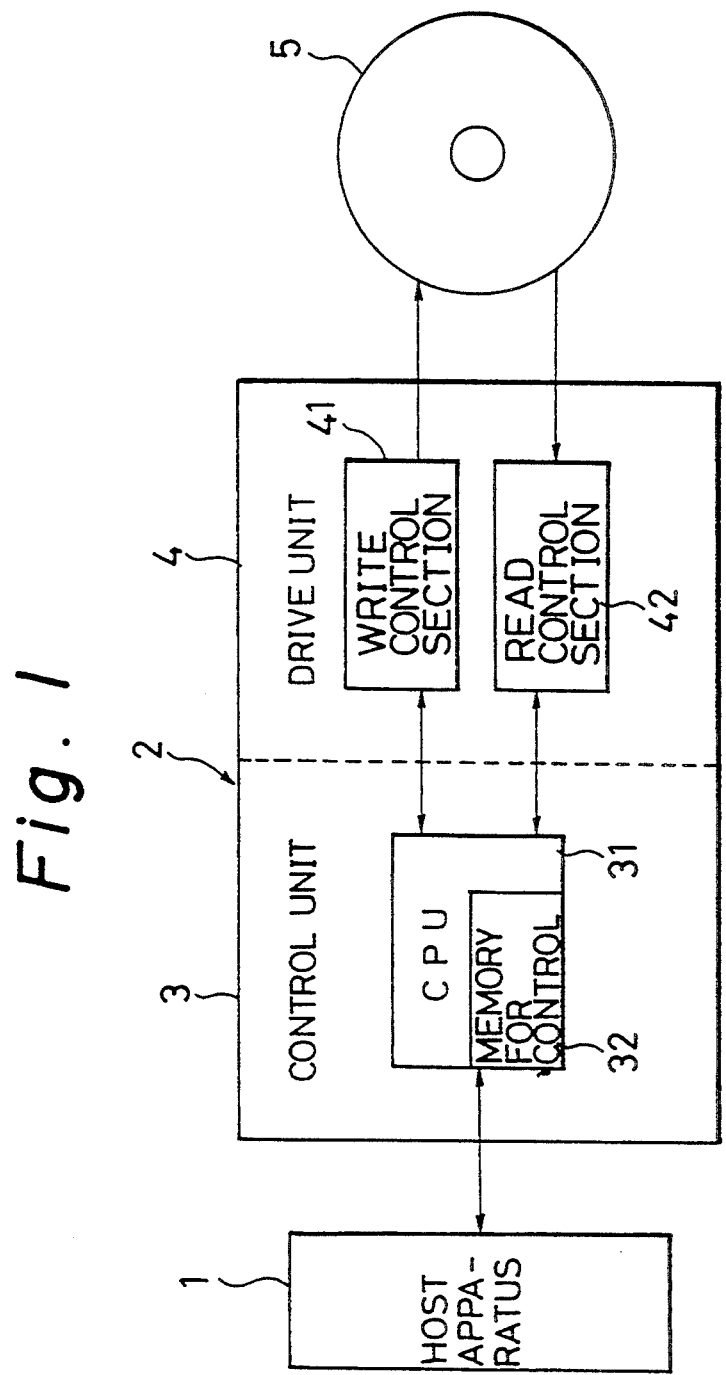
FIG. 1 is a functional block diagram to show a main structure of an embodiment of an optical disk apparatus according to the present invention.

FIG. 1 is a functional block diagram to show a main part of an embodiment of the optical disk apparatus according to the present invention. In FIG. 1, reference numeral 1 denotes a host apparatus, 2 an optical disk apparatus, 3 a control unit, in which 31 is a CPU and 32 is a memory for control, 4 a drive unit, in which 41 is a writing control unit and 42 is a reading control unit, and 5 a storage medium.

The optical disk apparatus 2 consists of the drive unit 4 having an interface to the storage medium 5 and of the control unit 3 having an interface to the host apparatus 1 and the memory 32 for control, as shown in FIG. 1.

Writing in and reading out of the storage medium 5 are carried out through the writing control unit 41 and the reading control unit 42 of the drive unit 4, respectively.

Figure 2:
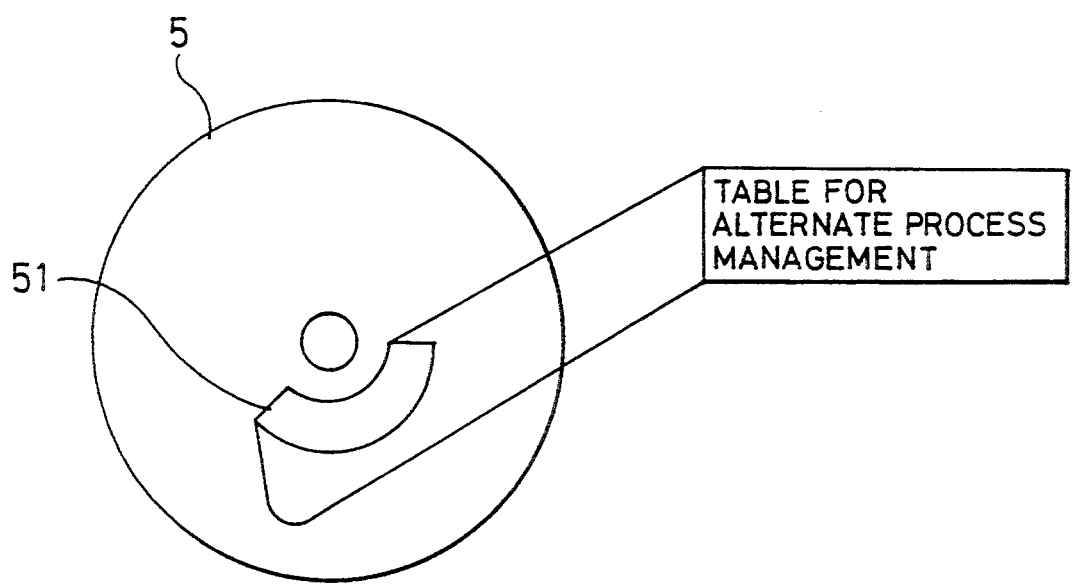
FIG. 2 is a conceptual diagram to show an example of management table for alternate process provided in a storage medium.

FIG. 2 is a conceptual diagram to show an example of a management table for alternate process provided in the storage medium 5. In FIG. 2, reference numeral 51 denotes a management table for alternate process.

The storage medium 5 is provided with a storage region of the management table 51 for alternate process as well as ordinary data storage regions, as shown in FIG. 2.

Once the storage medium 5 is set in the drive unit 4 of FIG. 1, a content of the alternate process management table 51 is read out under a control of the reading control unit 42 in the drive unit 4 and the read content is taken in the memory for control 32 provided in the control unit 3.

Suppose in the optical disk apparatus as shown in FIG. 1 that the alternate process is consecutively repeated for a defective sector due to occurrence of anomalous drive or anomaly in the storage medium for some reason when an information writing operation is tried to carry out into the storage medium 5.

In the optical disk apparatus of the present invention, the memory for control 32 in the control unit 3 stores information about a preset number of alternate process, i.e. an upper limit number.

Once the alternate process is consecutively repeated for a defective sector, the number of trials of alternate process is counted and it is compared with the above preset number of alternate process (limit number). When the repetition of alternate process reaches the preset number, the writing operation is suspended.

It is also suspended in this case to update the management table 51 for alternate process written on the storage medium 5 in addition to the suspension of writing operation.

Further, when such consecutive alternate processes are conducted and if there is a sector succeeded in alternate process immediately before the consecutive alternate processes, the reliability of writing operation for the alternate sector is inconveniently in doubt.

In order to cancel the writing of the alternate sector suspicious in reliability, a content of the alternate process management table 51 on the storage medium as shown in FIG. 2 is reread to recover the content of the alternate process management table on the memory 32 for control in the control unit 3 back into a state before the writing in the sector succeeded in alternate process.

In the above cases, the optical disk apparatus 2 informs the host apparatus 1 of occurrence of anomalous state through the interface.

Further, if a reading operation of the content of the alternate process management table 51 on the storage medium 5 is ended in an anomalous state, the apparatus suspends all operations including an access to the storage medium 5 and informs the host apparatus 1 of the occurrence of anomalous state of reading operation with a preset error code.

Since such an anomaly is a significant error, the error code is held in the control unit 3 to prevent the host apparatus 1 from overlooking it. Then the error code is always reported against any command from the host apparatus 1.

As explained above, the optical disk apparatus of the present invention has the preset limit number, which is an upper limit of times of retrial of writing for consecutively occurred alternate processes, to suspend the alternate process when it is repeated over the preset number.

Figure 4:
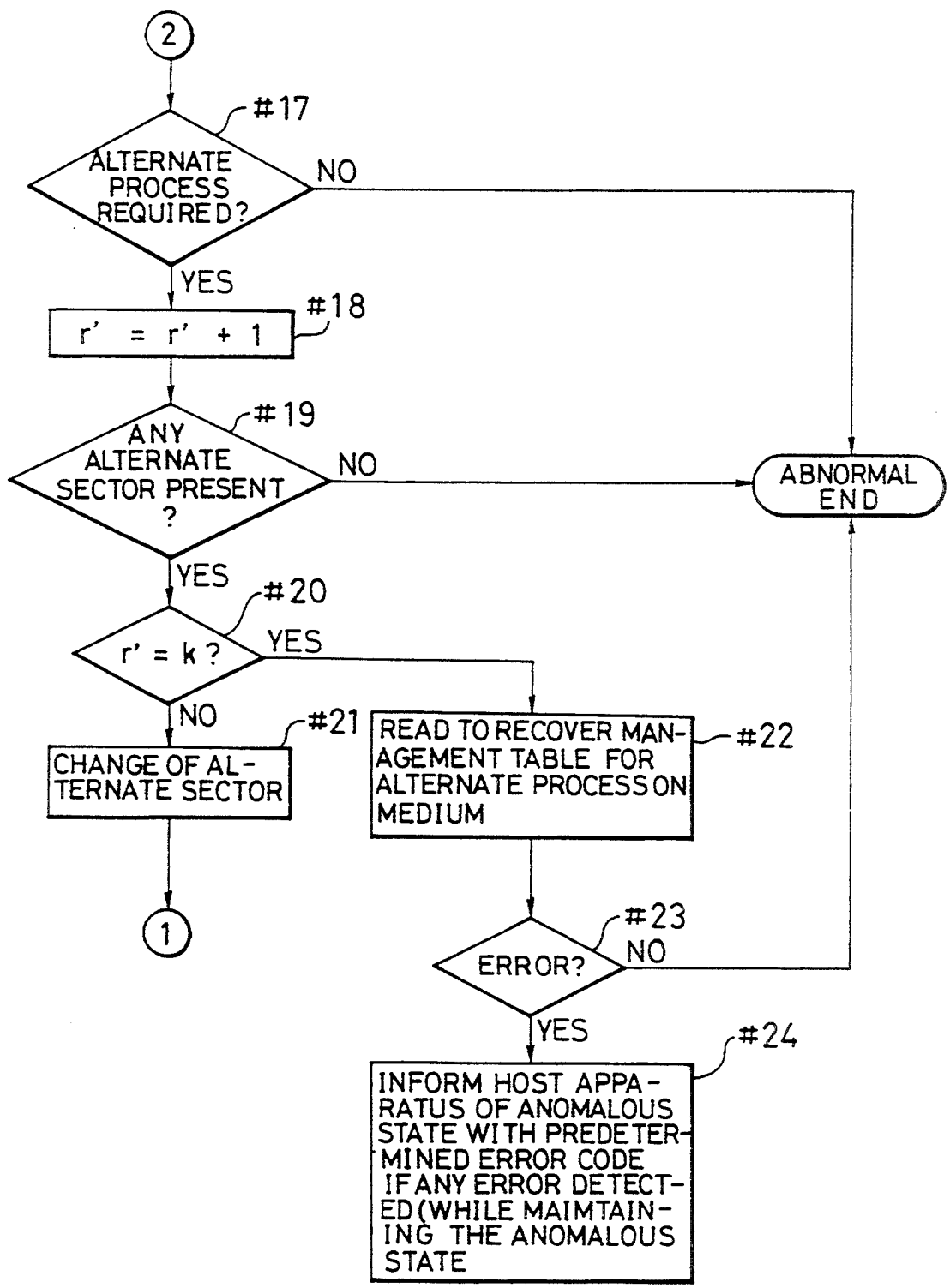
FIG. 4 is a flowchart to show a flow of main processes for the anomaly judgement and alternate process to be attached to the flowchart shown in FIGS. 3(i) and 3(ii) in the optical disk apparatus of the present invention.

The anomaly judgement and alternate process as above described, that is, the alternate process by the optical disk apparatus of the present invention, is carried out following a flow as shown in FIG. 3(i), FIG. 3(ii), and FIG. 4.

FIG. 3(i), FIG. 3(ii), and FIG. 4 are flowcharts to show a flow of main processes for anomaly judgement and alternate process in the optical disk apparatus of the present invention. In the figures, #1–#24 represent steps, r the number of retrial of writing operation, i an initial value of the retrial number r of writing, r' the number of consecutively occurred alternate processes in a routine of alternate process, k a threshold level to stop the alternate process, and ①  and ② connection points between FIG. 3(i), 3(ii), and 4.

In Step #1 of FIG. 3(i), it is set as r=i (initial value) and r'=0. The initial value i is an integer which is not negative.

In next Step #2, a writing operation is conducted into the storage medium.

In Step #3, it is checked whether an error occurs.

The check of error in Step #3 is a judgement about whether either a hard error in the storage medium or a hard error of drive unit occurs.

If there is no error occurred, it is judged as normal to conclude the flow of FIG. 3(i).

On the contrary, if there is an error occurred, the flow proceeds to next Step #4 to judge whether r=0. This judgement is a process to check that retrial of writing is carried out r times.

Unless r=0, it is set in Step #5 as r=r−1 and the flow returns to above-mentioned Step #2 to retry the writing into the storage medium, then repeating the same processes as described.

If it is judged in Step #4 that r=0, the flow goes to Step #6.

In Step #6, it is judged whether one of the two hard errors, or the hard error in the storage medium, occurs. If a hard error occurs in the storage medium, it is judged that the alternate process is necessary.

If the alternate process is unnecessary, or if a hard error of drive unit occurs, it is judged that there is an anomaly. Then the optical disk apparatus informs the host apparatus with a preset error code of the fact that an anomaly occurred. In this case, the anomalous state is not held in the apparatus, and the flow of FIG. 3(i) is concluded.

On the contrary, if it is judged that an alternate process is necessary, the flow proceeds to next Step #7 to conduct the alternate process. During the execution of alternate process, the management table for alternate process on the memory 32 for control is updated.

In next Step #8, it is again checked if either a hard error in the storage medium or a hard error of drive unit occurs.

If there is no error occurred, the flow goes to Step #14 to update the alternate process management table 51 on the storage medium 5. Then in next Step #15, it is checked if the writing operation is completed.

If the writing operation is completed, it is a case that a normal operation was conducted, and therefore the flow of FIG. 3(ii) is concluded.

If the writing operation is not completed yet, the flow goes to Step #16. In Step #16, it is set as r=i (initial value) and r'=0 to perform a writing operation into another remaining sector. Then the flow again returns to Step #2 as above described, then repeating the same processes.

If it is judged through the check of Step #8 that there is either of two hard errors occurred, the flow goes to Step #9.

In Step #9, it is set as r=i (initial value). In next Step #10, it is judged whether r=0. This judgement also is a process to check if the retrial of writing is repeated r times.

Unless r=0, a writing operation is retried in Step #11, and it is set in next Step #12 as r=r−1. The flow then goes to Step #13.

In Step #13, it is checked if either a hard error in the storage medium or a hard error of drive unit occurs.

If there is no error occurred, the alternate process management table 51 on the storage medium 5 is updated in Step #15, and the flow goes to Step #15, as described above.

On the contrary, it is judged through the check of Step #13 that there is one of the two hard errors occurred, the flow returns to Step #10, then repeating the above-described processes.

If it is judged in Step #10 that r=0, the flow goes from ② of FIG. 3(ii) through ② of FIG. 4 to Step #17.

The judgement in Step #17 about whether an alternate process is necessary is one in the case that a hard error is again occurred after execution of alternate process in Step #7, regarding whether a hard error occurs in the storage medium.

Accordingly, if an alternate process is unnecessary, i.e., if a hard error of drive unit occurs, it is judged that there is an anomaly to inform the host apparatus with the preset error code of the fact that an anomalous state occurred. In this case, the anomalous state is not held in the apparatus, either, and the flow of FIG. 4 is concluded.

On the contrary, if it is judged that an alternate process is necessary, or if a hard error occurs in the storage medium, the flow proceeds to Step #18 to set as r'=r'+1.

It is checked in next Step #19 if there is any other sector for alternate process on the storage medium. If there is no sector for alternate, it is likewise judged that there is an anomaly occurred, and the apparatus informs the host apparatus with the preset error code of the fact that the anomalous state occurred. The anomalous state is not held in the apparatus in this case, either, and the flow of FIG. 4 is concluded.

If there is a sector for alternate process upon judgement in Step #19, the flow goes to Step #20 to check if r'=k. This check is a process to judge whether the number r' of alternate processes consecutively occurred in the alternate process routine reaches a threshold level k for stopping the alternate process.

Unless r'=k, the flow goes to Step #21 to change a sector for alternate process, and returns through ① of FIG. 4 and ① of FIG. 3(i) to Step #7, then repeating the same processes.

If r'=k upon judgement in Step #20, the flow goes to Step #22 to read the content of the alternate process management table 51 on the storage medium.

It is checked in next Step #23 if either a hard error in the storage medium or a hard error of drive unit occurs.

If there is no hard error occurred, it is judged there is an anomalous state for an unknown reason, and then the flow of FIG. 4 is concluded.

If there is a hard error occurred upon judgement in Step #23, the flow goes to next Step #24 to output a predetermined error code to inform the host apparatus of the occurrence of anomalous state. In this Step #24, the apparatus holds the anomalous state, different from other cases of previous anomalous states.

Many widely different embodiments of the present invention may be constructed without departing from the spirit and scope of the present invention. It should be understood that the present invention is not limited to the specific embodiment described in the specification, except as defined in the appended claims.

What is claimed is:

1. A method for controlling an optical disk apparatus which executes an alternate process of a defective sector, stores control table storing the data for controlling the alternate process, and writes the control table into a storage medium, the method comprising the steps of:

attempting to perform a writing operation for writing information into a sector;

executing an alternate process for a defective sector by alternating the defective sector with one of a plurality of sectors for alternate process and by writing said information into said one of a plurality of sectors for alternate process when said writing operation into said sector cannot be finished due to the occurrence of an anomalous state;

counting the number of times the alternate process has been executed for the defective sector;

comparing said number of times with a preset number of times; and suspending the writing operation when the executing step is repeated for the defective sector by the preset number of times on the basis of the comparison result.

2. A method according to claim 1, wherein the method further comprises the step of preventing updating of the control table for alternate process written on the storage medium.

3. A method according to claim 1, wherein the method further comprises the steps of:

reading a content of the control table for alternate process on the storage medium after suspending of the writing operation;

writing the content of the control table in the control memory; and informing a host apparatus of the occurrence of the anomalous state.

4. A method according to claim 3, wherein the method further comprises the steps of: suspending all operations, including an access to the storage medium, and informing the host apparatus of the occurrence of the anomalous state with a preset error code, when said step of reading of the content of the control table for alternate process on the storage medium ends in an anomalous state.

5. A method according to claim 4, wherein the method further comprises the step of, after the step of reading of the content of the control table for alternate process ends in the anomalous state, maintaining said error code to answer any command from the host apparatus with the error code.

* * * * *